United States Patent [19]
Lepage

[11] Patent Number: 6,155,508
[45] Date of Patent: Dec. 5, 2000

[54] LARGE ARBOR FLY FISHING REEL

[75] Inventor: James B. Lepage, Manchester Center, Vt.

[73] Assignee: The Orvis Company, Inc., Manchester, Vt.

[21] Appl. No.: 09/393,490

[22] Filed: Sep. 10, 1999

[51] Int. Cl.[7] .................. A01K 89/016; A01K 89/033
[52] U.S. Cl. .................. 242/303; 242/295; 242/318; 242/322; 242/323
[58] Field of Search .................. 242/295, 303, 242/317, 318, 322, 323

[56] References Cited

U.S. PATENT DOCUMENTS

| | | |
|---|---|---|
| 1,272,361 | 7/1918 | Bergevin . |
| 1,398,429 | 11/1921 | Harradine .................. 242/295 |
| 1,452,808 | 4/1923 | Lee . |
| 2,035,279 | 3/1936 | Shakespeare, Jr. . |
| 2,334,646 | 11/1943 | Price . |
| 2,559,433 | 7/1951 | Hurd . |
| 2,896,876 | 7/1959 | Bogar .................. 242/318 |
| 3,229,406 | 1/1966 | Binkley . |
| 3,557,483 | 1/1971 | Wilson . |
| 4,014,127 | 3/1977 | Turner . |
| 4,720,056 | 1/1988 | Danielsson . |
| 4,878,309 | 11/1989 | Gough . |
| 4,883,238 | 11/1989 | Harder . |
| 5,120,003 | 6/1992 | Sacconi .................. 242/317 |
| 5,211,273 | 5/1993 | Castens . |
| 5,237,770 | 8/1993 | Creek . |
| 5,557,875 | 9/1996 | Testa . |
| 5,607,114 | 3/1997 | Henriksson .................. 242/318 |
| 5,626,303 | 5/1997 | Bringsen . |
| 5,915,639 | 6/1999 | Farris . |
| 6,003,800 | 12/1999 | Adenot et al. .................. 242/322 |

FOREIGN PATENT DOCUMENTS

| | | |
|---|---|---|
| 484805 | 7/1952 | Canada . |
| 831502 | 9/1938 | France . |

OTHER PUBLICATIONS

Catalog pages illustrating Lamson fly reels, loop fly reels and tibor reels.

Instruction sheet and parts drawing of a reel offered by Orvis known as the Odyssey Brand reel.

*Primary Examiner*—Katherine A. Matecki
*Attorney, Agent, or Firm*—Vickers, Daniels & Young

[57] ABSTRACT

A large arbor fly fishing reel is provided with a smooth drag and the ability to change spools without removing any additional parts. The reel is provided with spring loaded locking tabs permanently fixed to a spool base which retain the spool upon the spool base and a drag to which pressure is applied through a central spring.

23 Claims, 5 Drawing Sheets

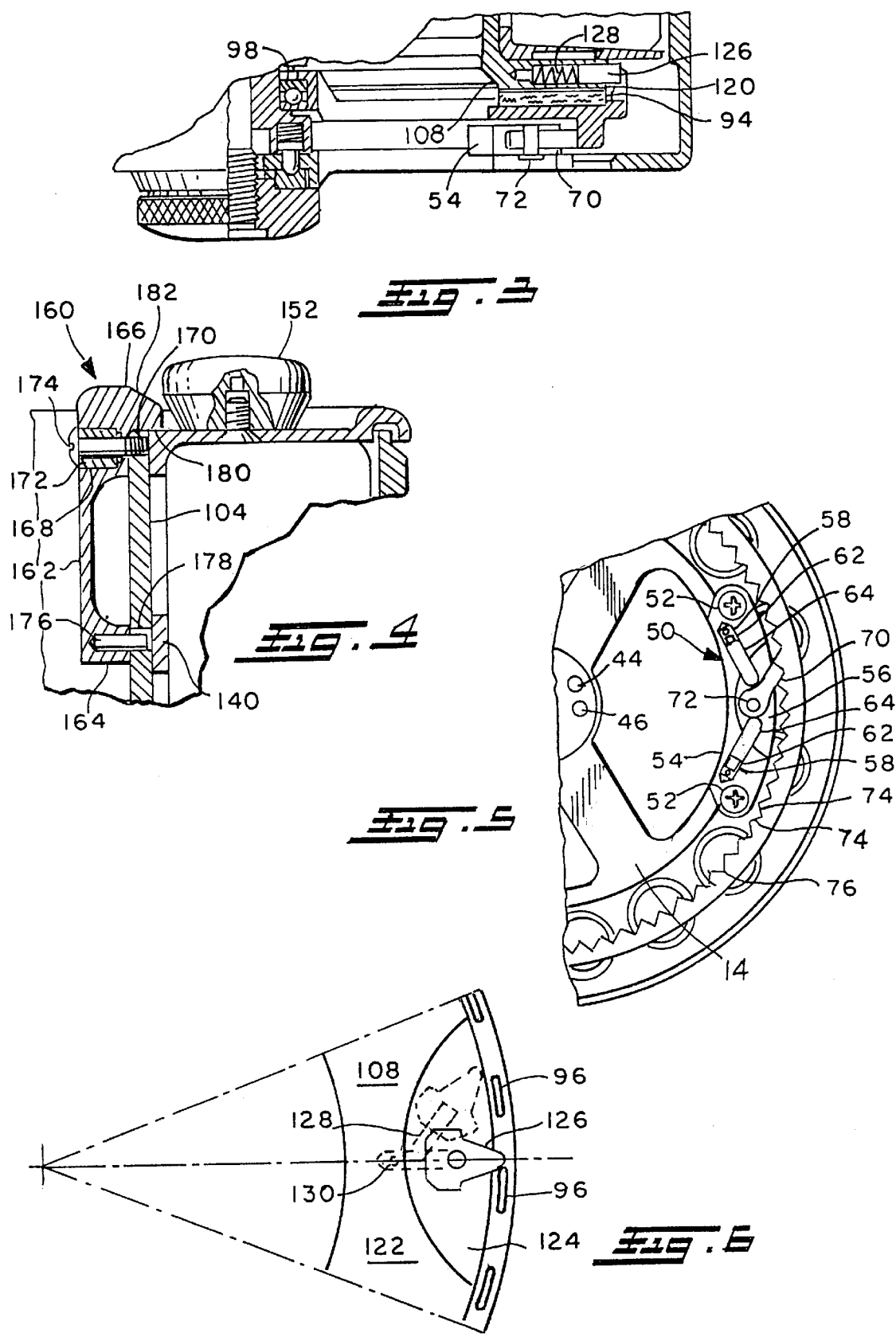

LARGE ARBOR FLY FISHING REEL

FIELD OF THE INVENTION

The present invention pertains to the art of fly fishing reels and more particularly to a large arbor fly fishing reel having an improved spool retaining arrangement and drag system.

BACKGROUND OF THE INVENTION

Fly fishing requires three major pieces of equipment: a fly fishing rod, a reel and a line. The line, which normally consists of a backing segment, a fly line segment and a leader segment, is retained upon the reel which is in turn retained upon the fly rod. The line is strung through the fly rod and a fly attached to the end of the leader. The weight of the fly line and the properties of the fly rod are then used to cast the fly line and hence the fly to a desired location with a desired presentation in hopes of catching a fish. Each piece of equipment is required to perform several tasks to catch a fish.

A fly fishing reel retains the fly line in orderly coils on a spool when the equipment is not in use. The fly line may take a memory set if it is coiled on a small diameter arbor.

Additionally, a reel must provide drag. Drag is tension or resistance applied to the line when a fish takes the fly and tries to swim away. Most modern reels provide variable drag resistance. When a fly fisher uses a light leader and tippet, a light drag must be used or the fish will break the line and escape. A drag must apply resistance in the "line out" direction but should not apply any resistance in the "line in" direction. One sometimes needs to reel in quickly to avoid slack as a fish swims toward one. When the line is slack, control of the fish is lost. The fish may tangle the line or apply a shock to the tippet/leader, snapping it.

The "line out" and "line in" directions are not generally fixed with respect to reel products. This is because some fly fishers prefer to retrieve line with their left hand while other fly fishers prefer to retrieve line using their right hand. Reels must therefore be capable of in effect interchanging the line in/line out directions.

Additionally, it is sometimes desirable to change line when fishing. One mechanism for doing this is to supply additional spools with a reel. The fly fisher stores different kinds of line on the different spools and then interchanges the spools on the reel. Thus, line changes in the field are facilitated.

The above-described problems and design issues are amplified in the salt water environment. When one is fishing in salt water, one is usually seeking larger, stronger fish. One is using heavier tackle in a more corrosive environment.

Over the last few years, large arbor reels have appeared. These reels have spools with large, central arbors and two side walls. The large arbors allow a spool to accommodate larger coils of line while minimizing the weight for the size of coils. However, numerous problems still exist. Changing spools often involves removing more parts than the spool itself. Parts can be lost or damaged. Drag mechanisms are sometimes less than ideal. Switching a reel from right-hand retrieve to left-hand retrieve can be complicated and/or difficult. Some reels cannot withstand the rapid, forceful line draw of a strong, fast saltwater game fish. An improved reel is needed.

SUMMARY OF THE INVENTION

In accordance with the present invention, a large arbor fly fishing reel is provided having a spool retaining structure which remains attached to the reel when a spool is disengaged.

Still further in accordance with the invention, a fly fishing reel is provided in which spool retaining locks are fixed to a spool base and can be disengaged from a spool without removal from the spool base.

Still further in accordance with the invention, a large arbor fly fishing reel is provide with spool retaining locks on a spool base having camming surfaces which push the locks out of the way automatically when one replaces a spool on a reel.

Still further in accordance with the invention, a large arbor fly fishing reel is provided in which two engaging drag friction surfaces are mounted on facing disks both of which are carried on a shaft.

Yet further in accordance with the invention, one of a pair of interengaging drag surfaces is carried upon a spool base rotatable upon a shaft and another drag surface is carried on a friction plate rotatable upon the same shaft and the friction plate is selectively allowed or disallowed to rotate with respect to the reel frame depending on the line in, line out direction of the spool.

Still further in accordance with the invention, a drag adjustment is provided comprising an adjustment knob on the outside of the reel which moves a spring toward or away, from the spool base which thereby alters the spring force applied through such spool base to the drag surfaces.

The primary object of the present invention is to provide a large arbor fly fishing reel which is robust in design and suitable for use in challenging environments such as salt water flats.

It is yet another object of the present invention to provide a large arbor fly fishing reel in which a line containing spool can be removed from the reel without the removal of any other parts and an alternate spool mounted on the reel without the removal of any other parts.

It is still another object of the present invention to provide a large arbor fly fishing reel in which one can easily replace spools without removing other parts hence lowering the probability of loss of parts in the spool replacement process.

Still another object of the present invention is to provide a large arbor fly fishing reel having a large area disk drag which is switchable between right-hand retrieve and left-hand retrieve operation.

It is yet another object of the present invention to provide a large arbor fly fishing reel in which a spool can be placed upon the reel by simply lining the spool up with the spool base of the reel and pressing it toward the frame wall.

It is yet another object of the present invention to provide a large arbor fly fishing reel in which replaceable spools are held on a reel by locks permanently fixed to the reel which visually indicate the locked or unlocked status of the spool to the reel.

It is still another object of the present invention to provide a large arbor fly fishing reel in which a large area drag is supported upon disks in turn supported upon a shaft by ball bearings.

It is still another object of the present invention to provide a large arbor fly fishing reel having a smooth, low friction operation one desires and a variable smooth drag.

It is still another object of the present invention to provide a large arbor fly fishing reel which is smooth in operation, robust and particularly well suited for fly fishing for a larger species including salt water fly fishing.

These and other objects of the present invention will become apparent from the following description of the preferred embodiment of the invention taken together with the accompanying drawings.

BRIEF DESCRIPTION OF THE DRAWINGS

The invention may take physical form in certain parts and arrangements of parts, a preferred embodiment of which will be described in detail and which is illustrated in the accompanying drawings which form a part hereof and wherein:

FIG. 3 is an enlarged portion of the cross-section of FIG. 2 showing the drag and clicker in greater detail;

FIG. 4 is a second enlarged portion of the cross-section in FIG. 2 showing the spool locking structure in greater detail;

FIG. 5 is a plan view of the drag reversing pawl structure also seen in FIG. 3;

FIG. 6 is a plan view of the clicker structure also seen in FIG. 3;

DESCRIPTION OF THE PREFERRED EMBODIMENT

Figure 1:
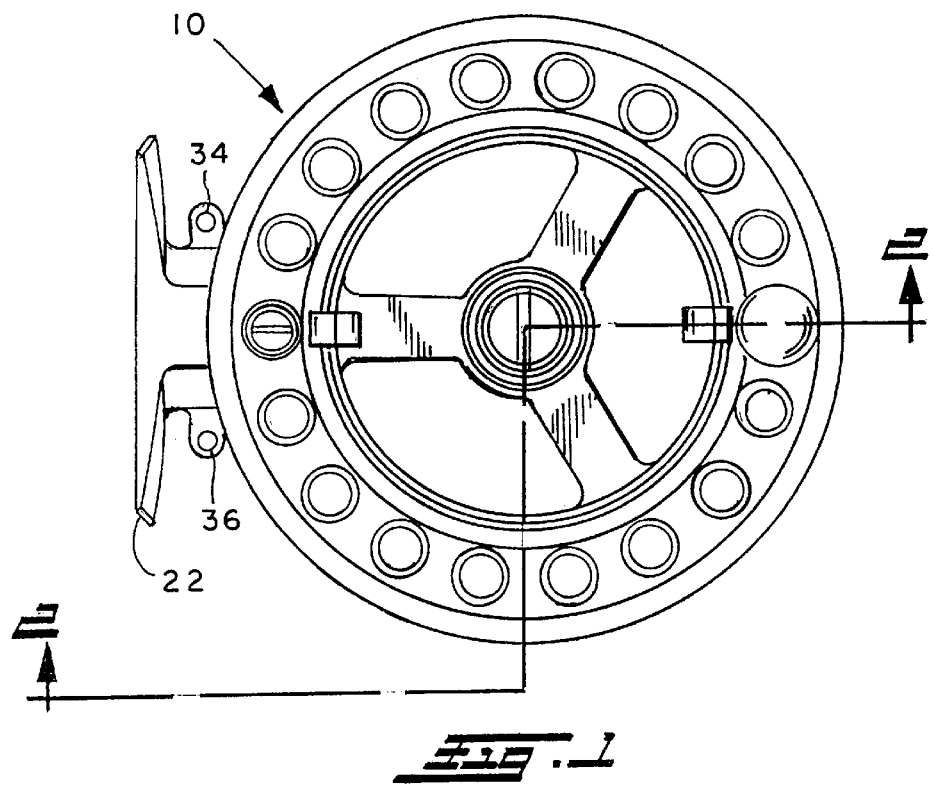
FIG. 1 is a side elevation of a preferred embodiment of the invention showing the handle side of the reel.

Referring now to the drawings wherein the showings are for the purpose of illustrating a preferred embodiment of the invention only and not for the purpose of limiting same. FIG. 1 shows a large arbor fly fishing reel 10 in accordance with the present invention. The reel 10 comprises several subassemblies including a frame 12 (FIG. 7), a friction plate 14 (FIG. 8), a spool base 16 (FIG. 9), a spool 18, and a shaft assembly 20.

The frame 12 is comprised of a perforated sidewall 26 and a cylindrical portion 28. The cylindrical portion is narrow in the axial direction over most of its circumference. A foot extension 30 and a top extension 32 of the cylindrical portion extend away from the sidewall 26 for the entire axial width of the reel. The foot 22 is attached to the foot extension 30 by means of machine screws or the like. The foot 22 includes two round holes 34, 36 which can be used by a fly fisher as a hook retainer. As is conventional, the foot 22 is used to fix the reel 10 to a fly rod.

Both the foot extension 30 and the top extension 32 are arcuate and follow the periphery of the cylindrical portion 28 of the frame. The frame 12 has a central aperture 40 which is coaxial with the frame side wall 26. A disc 42 surrounds the central aperture 40. The disk 42 is provided with three screw holes 44 and multiple detente holes 46. The screw holes 44 and detente holes 46 are arranged on a circle coaxial with the axis of the frame side wall 26. The three screw holes 44 are evenly spaced on the circle and the multiple detente holes (only two are shown) are evenly spaced around a circle.

At least one pair of drag pawl assembly screw holes 48 are provided on the frame side wall 26 close to its outer periphery. A pawl assembly 50, seen in FIG. 5, is fixed to the frame side wall 26 by means of machine screws 52 in the screw holes 48. A pawl holder 54 consists of an arcuate piece of metal attached by the machine screws 52. The pawl holder 54 has two flat sides and is relatively thin. A large recess 56 is cut into the outwardly facing edge of the pawl holder 54. This recess has a curved inner bottom, which curve extends toward the axis of the reel. Two blind holes 58 are drilled into the pawl holder 54 with the openings of the blind holes in the recess 56. Each of the blind holes 58 accommodate a spring 62 and a pawl pin 64. The pawl pins 64 engage two sides of a ratchet pawl 70 which is rotatable about a pawl shaft 72. The pawl shaft 72 has an enlarged head and is retained in holes in the pawl holder 54. As can be best seen in FIG. 5, the ratchet pawl 70 has a flat end and engages an arcuate saw tooth surface 74 on the friction plate 14. Looking at FIG. 5, the saw tooth surface 74 can rotate in a counterclockwise direction with respect to the ratchet pawl 70. The ratchet pawl 70 is pushed against the upper pawl pin 64 as a saw tooth engages it and then pushed up into the next recess 76 between adjacent saw teeth. However, an attempt to rotate the arcuate saw tooth surface 74 in the clockwise direction is restrained by the ratchet pawl 70. In this direction, the ratchet pawl holds against the saw tooth 74 preventing rotation. If one wishes the saw tooth to be able to rotate in the clockwise direction, one simply flips the pawl 70 to be extending downwardly as seen in FIG. 5. The pawl then engages the other pawl pin 64 and will allow clockwise motion and prevent counterclockwise motion. As the friction plate 14 can be separated from the frame 12 by the reel user, this switch from counterclockwise to clockwise rotation is a simple matter of flipping the ratchet pawl 70.

A shallow recess 78 is provided in the frame side wall 26 midway between the two drag pawl assembly screw holes 48. This recess 78 accommodates and retains the head of the pawl shaft 72.

Only a single drag pawl assembly 50 is illustrated in the drawings. A second drag pawl assembly can be fixed to the frame side wall in a second set of holes and recesses 48, 78 diametrically opposed to the first set. In the preferred embodiment of the invention, two drag pawl assemblies are used. However, two drag pawl assemblies are not required.

Figure 11:
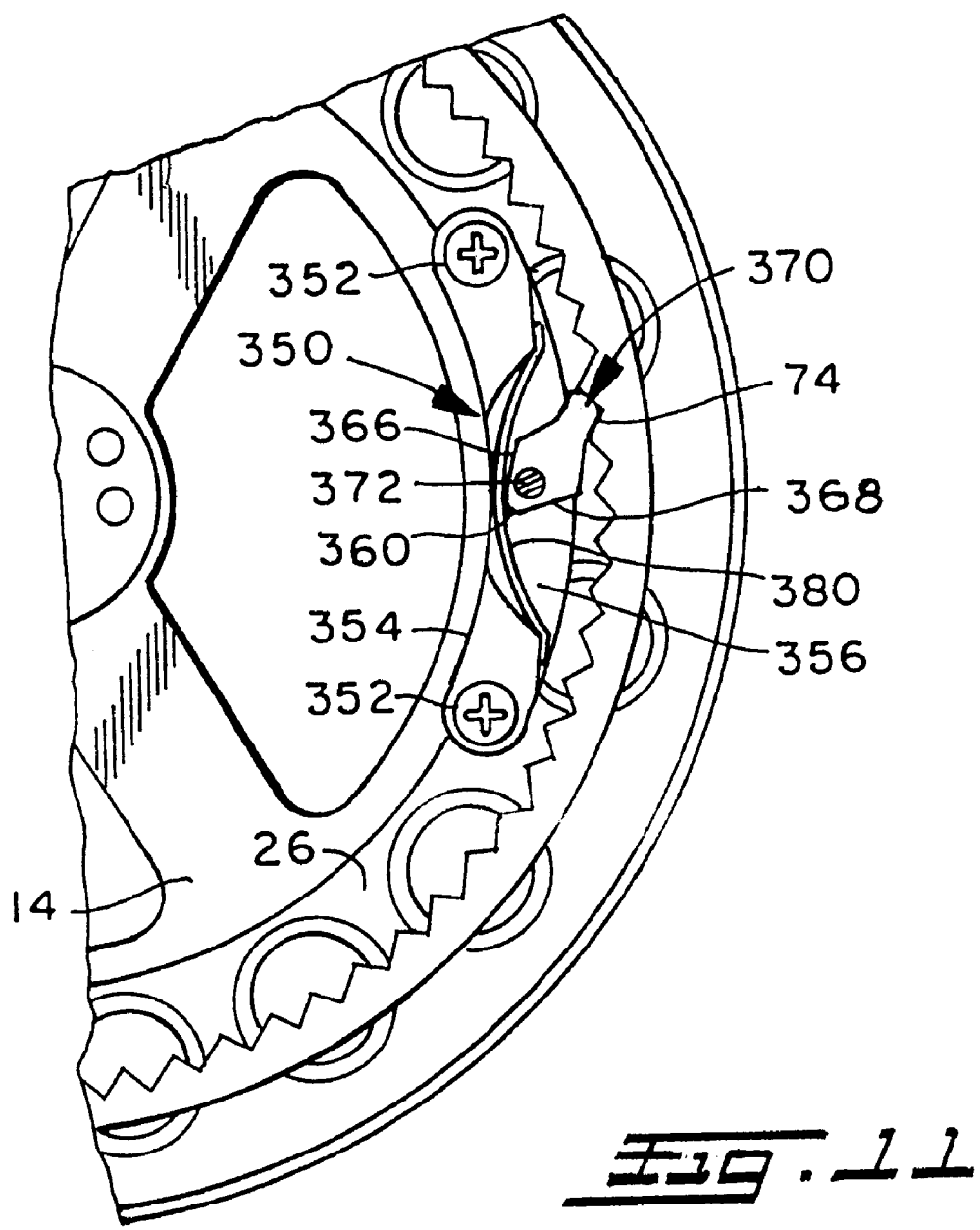

A second embodiment of the drag pawl assembly 350 is shown in FIG. 11. A flat, arcuate pawl holder 354 is fixed to the frame side wall 26 by machine screws 352. The drag pawl holder 354 has two flat sides and is relatively thin. A large recess 356 is cut into the outwardly facing edge of the drag pawl holder 354. This recess 356 has a curved inner bottom which curve extends toward the axis of the reel. A ratchet pawl 370 is rotatable about a pawl shaft 372. The pawl shaft 372 has an enlarged head retained in a recess in the frame side wall 26. The other end of the pawl shaft 372 is retained in a hole in the middle of the drag pawl holder 354. The pawl 370 has a flat end which engages the arcuate saw tooth surface 74 on the friction plate 14. The opposite end of the ratchet pawl 370 comprises two spring engagement surfaces 366 and 368 which come together forming a point 360 at about 65° angle. One of the spring engagement surfaces 366, 368 bears against a flat strip leaf spring 380, the ends of which bear against the recess 356. The spring 380 holds the pawl 370 in engagement against the saw tooth surface 74 allowing either clockwise or counterclockwise rotation as described with respect to FIG. 5. The pawl 370 can be switched from clockwise to counterclockwise rotation by flipping the pawl 370 with one's finger. This arrangement is preferred to that seen in FIG. 5.

Figure 8:
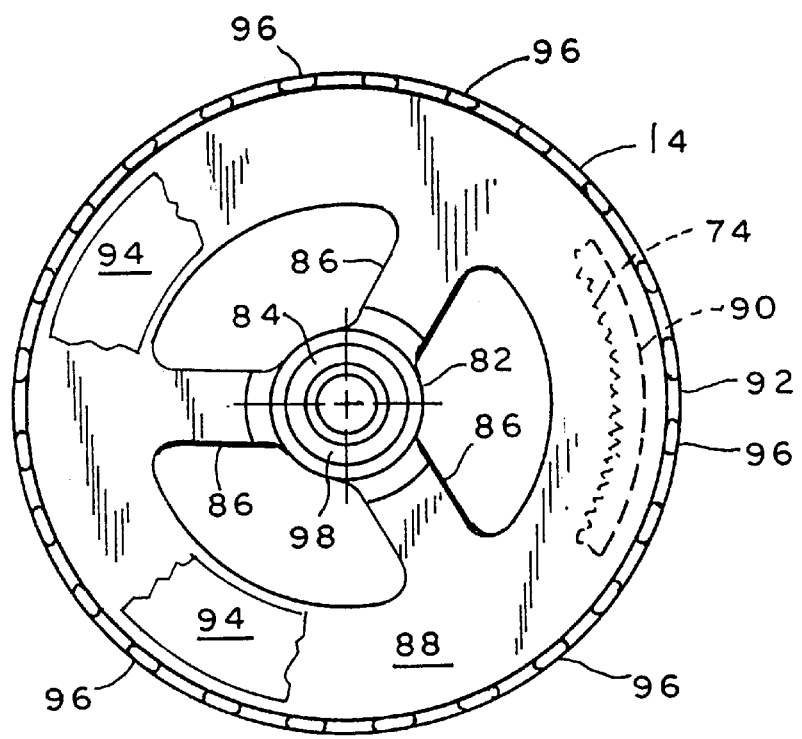
FIG. 8 is a plan view of the friction plate of the preferred embodiment.
Figure 9:
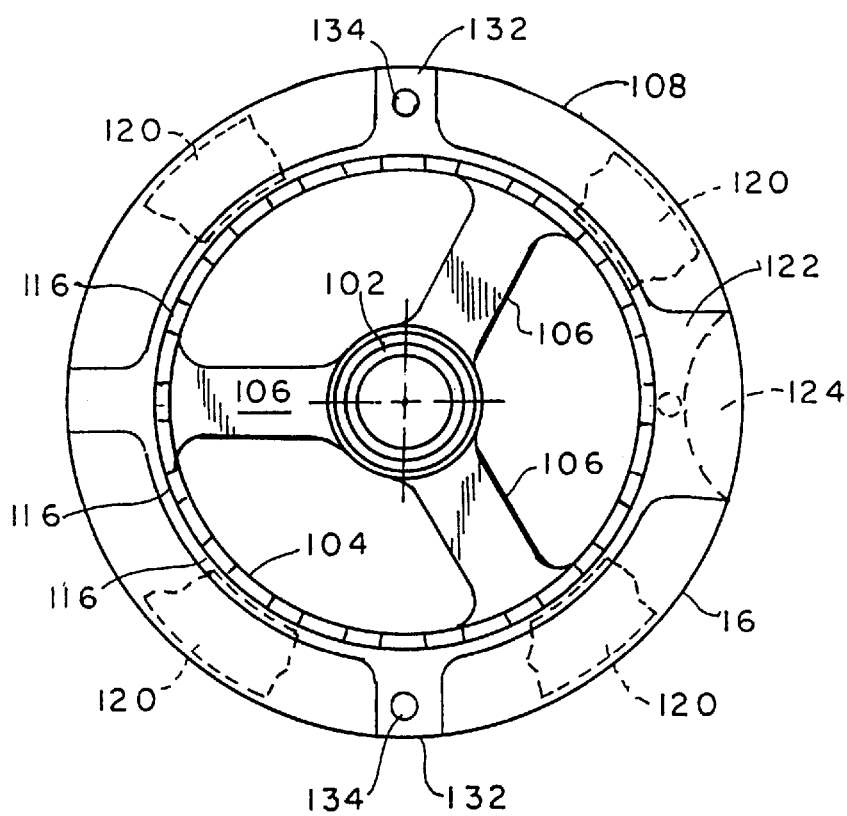
FIG. 9 is a plan view of the spool base used in the preferred embodiment.

The shaft assembly 20 is fixed to the frame 12 at the center of the frame side wall 26. The friction plate 14, FIG. 8, is rotatable above the shaft assembly 20 adjacent to the frame side wall 26. The friction plate 14 comprises a central disk 82 having a central aperture 84. Three spokes 86 extend from the central disk to an outer annulus 88. The side of the annulus 88 facing toward the frame side wall 26 carries the arcuate saw tooth surface 74 on a ridge 90 which extends toward the frame side wall 26 near the periphery 92 of the friction plate 14. A thin flat annular cork 94 (shown partially only) is fixed to a side of the friction plate 14 facing away from the frame side wall 26. The cork is relatively large in surface area as it extends completely around the friction plate 14 and covers almost the entire outer annulus 88. Upstanding teeth 96 extend axially from the periphery 92 of the friction plate 14. The teeth 96 are spaced from one another a distance a little greater than their circumferential width. A large number of teeth, e.g., 24 are preferred. A ball bearing 98 is retained in the central aperture 84 and allows the friction plate 14 to freely rotate with respect to the shaft assembly 20 upon which it is carried. As previously discussed with respect to the drag pawl assembly 50, the friction plate 14 can selectively rotate in one direction only with respect to the frame 12 because of the action of the ratchet pawl 70.

The spool base 16 is comprised of an inner cylinder 102, an outer cylinder 104, three spokes 106 interconnecting the inner cylinder 102 and the outer cylinder 104 and an outer annulus 108 extending outwardly from the outer cylinder 104. The inner cylinder 102 is supported on the shaft assembly 20 by two ball bearings 110, 112. The ball bearings are received in recesses in the inner cylinder 102 and do not move axially with respect to the inner cylinder 102. The ball bearing 112 toward the frame side wall 26 sits against a shoulder 114 on the shaft assembly 20 which restrains axial movement of the bearing and hence the spool base 16. The inner cylinder 102 is hollow and relatively short in the axial direction. It rigidly and rotatably supports the spool base on the shaft assembly 20.

The spokes 106 extend from the end of the inner cylinder 102 closest to the frame side wall 26. The spokes extend outwardly to the outer cylinder 104 which is axially longer than the inner cylinder 102. The outer cylinder is provided with numerous perforations 116 to reduce its weight.

The outer annulus extends radially from the end of the outer cylinder closest to the frame side wall 26. A plastic plane bearing 120 is fixed to the side of the outer annulus 108 facing the friction plate 14. The plane bearing 120 is shown in partial segments in FIG. 9 in dashed lines as it is on the opposite side of the outer annulus from that view in the figure. The plane bearing 120 is annular in shape and substantially identical in size to the cork drag surface 94 carried on the friction plate. The plane bearing 120 rests against the cork 94 when the reel is assembled. The plane bearing is fabricated from a bearing material, such as a filled PTFE, which provides a smooth friction drag against the cork. One appropriate bearing material is sold under the trademark RULON. Other plastic bearing materials would also be appropriate.

The outer annulus 108 is provided with a thickened portion 122 in which a deep recess 124 is cut. A clicker pawl 126 (FIG. 6) is supported on a clicker pawl spring 128 which is peened or pinned into a hole 130 in the base of the recess 124. FIG. 6 shows a segment of the outer annulus 108 and a segment of the teeth 96 on the friction plate 114. The clicker pawl is shown solidly in its rest state and in dotted lines in its deflected state as it will be deflected when tie clicker pawl passes by a tooth in a clockwise direction. The function of the clicker pawl is to simply make a distinctive clicking noise when the spool base 16 rotates with respect to the friction plate 14.

Two additional thickened portions 132 are provided in the outer annulus 108. The two thickened portions 132 are at opposite ends of a diameter perpendicular to the diameter upon which the first thickened portion 122 is placed. Upstanding studs 134 are permanently fixed in these thicken portions. The studs 134 are used to lock the spool 18 to the spool base 16.

The spool 18 (FIG. 2) comprises a cylindrical portion 140, an inner annular side wall 142 and an outer annular side wall 144. The cylindrical portion, inner side wall and outer side wall all have multiple perforations 146 to reduce weight. Additionally, two of the perforations in the inner side wall closely surround the studs 134 on the outer annulus 108 of the spool base. This engagement of the studs 134 in the perforations prevents rotation of the spool 18 with respect to the spool base 16.

The handle 150 and counterweight 152 are fixed to the outer annular side wall 144 by machine screws or the like. The outer periphery of the outer annular side wall 144 is provided with a recess and a lip which will closely accommodate but not contact the ends of the foot extension 30 and top extension 32 of the frame 12.

The spool 18 is releasably held upon spool base 16 by means of two identical locks 160. The locks 160 are fixed at opposite ends of a diameter on the spool base to the inner surface of the outer cylinder 104. As can be best seen in FIG. 4, a lock 160 has an axial portion 162 an inner radial portion 164 and an outer radial portion 166. The outer radial portion 166 is provided with a spring recess 168 and a screw hole 170 coaxial with the spring recess. A spring 172 is contained in the spring recess 168. The spring 172 is retained against a shoulder forming the bottom of the spring recess 168 and its outer end engages the head of a machine screw 174, the body of which passes through the spring recess 168, the spring hole 170 and into the spool base outer cylinder 104. The screw 174 is fixed with respect to the spool base. The lock 160 however can travel with respect to the spool base by compressing the spring 172.

A pin 176 extends from the lock inner radial portion 164. The pin rests in a slot 178 which is somewhat longer than wide and loosely accommodates the pin 176.

The outer radial portion 166 of the lock 160 extends beyond the axial end of the spool base outer cylinder 104. The outer radial portion of the lock 160 also extends beyond the outer radial surface of the spool base outer cylinder 104 when the lock 160 is in the rest position. As can be seen in FIG. 4, in the rest position, the flat inner surface 180 of the outer radial portion 166 rests against the spool outer annular side wall 144 thereby restraining the spool from axial movement with respect to the spool base 16. With the lock 160 in this position, the spool 18 is held tightly against the spool base thickened portions 122, 132 and the studs 134 on the spool base are held in matching recesses on the spool. The spool is therefore securely locked in place and will rotate as a unit with the spool base 16.

When it is desired to remove the spool from the spool base, one simply pushes the locks 160 toward the central axis of the reel. The spool is thus unlocked from the spool base and may be easily removed. As can be best seen in FIG. 4, the outer surface of the outer radial portion 166 includes a radial outer portion 182 which slopes outwardly and toward the frame side wall 26. When one wishes to replace a spool 18 on the spool base 16, one simply pushes the spool toward the frame side wall. The inner annular side wall 142 of the spool engages the radial outer portions and pushes the locks 160 to the unlocked position allowing the spool to be slid upon the spool base 16.

Figure 2:
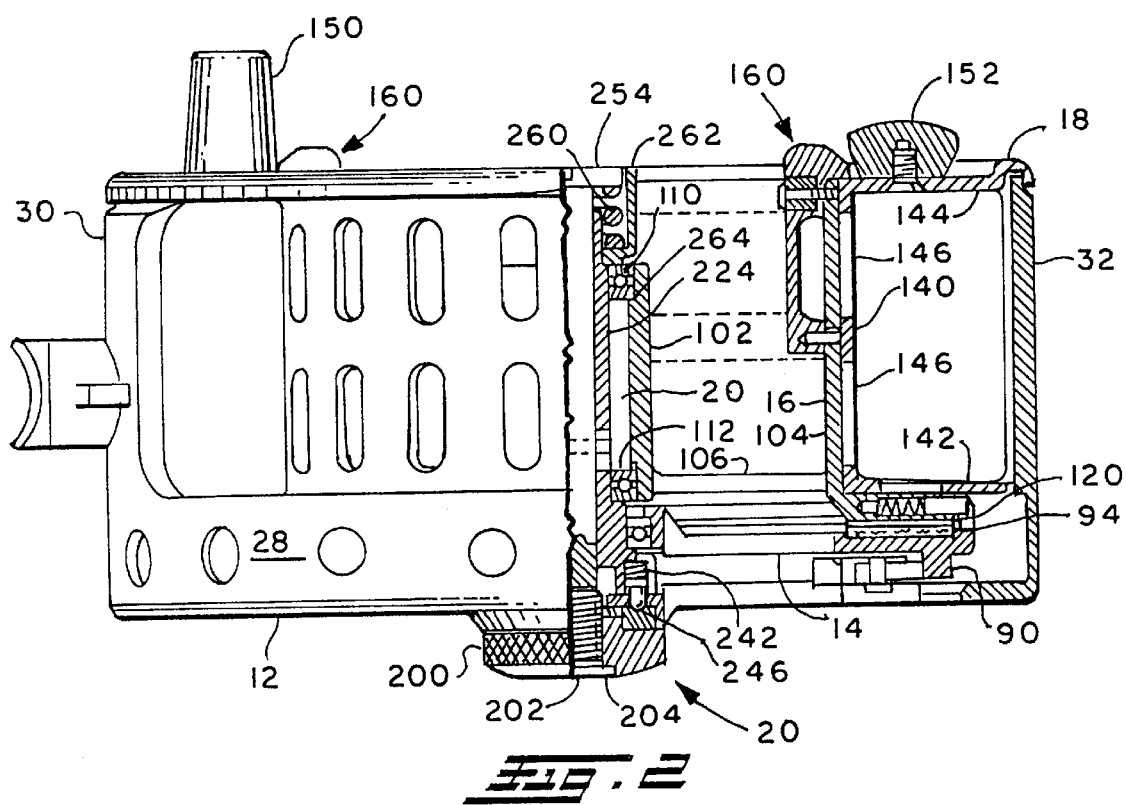
FIG. 2 is a partial section of the embodiment shown in FIG. 1 taken line 2—2 of FIG. 1.
Figure 10:
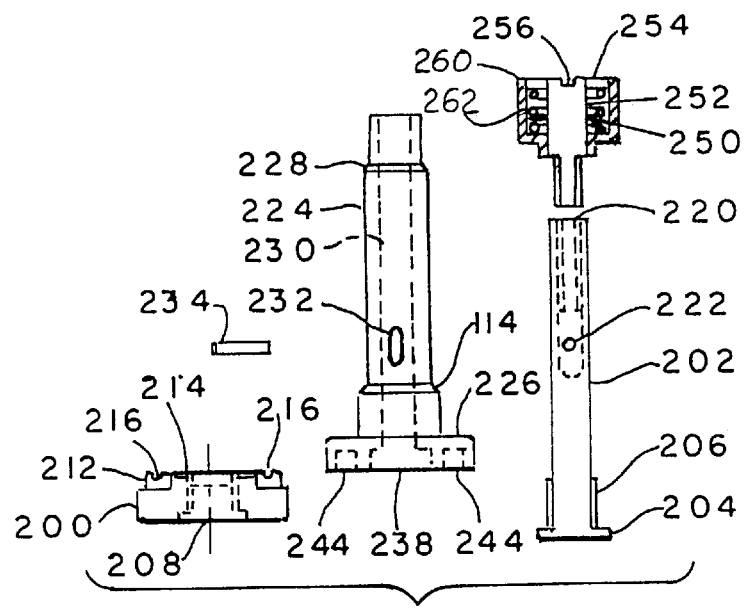
FIG. 10 is a view of some of the major elements of the shaft assembly of the present invention disassembled; and, FIG. 11 is a plan view similar to FIG. 5 showing an alternate drag reversing pawl structure.

The shaft assembly and drag adjustment can be seen in FIG. 2. Additionally, several major elements of the shaft assembly are illustrated in the disassembled state in FIG. 10. A knob 200 is provided on the outside of the frame side wall 26. The knob 200 is disk shaped and knurled around its edge for easy turning by the user. The knob 200 has a central aperture which is threaded and coaxial with the knob itself. A knob shaft 202 is provided with an enlarged end 204 and threads 206 directly adjacent the enlarged end 204. The knob shaft 206 is threaded through the aperture 208 with the shaft head 204 received in a mating recess.

The knob 200 has an annular projection coaxial with the axis of the knob extending from the side facing the frame side wall 26. A detente ring fits around this projection. A plastic washer 214 sits on top of the projection axially inside of the detente ring 212. The detente ring 212 has about a dozen dimples 216 regularly spaced in a circle around the surface facing the frame side wall 26.

The knob shaft 202 is also provided with a threaded blind hole 220 entering the shaft at the end opposite the enlarged end 204. The threaded hole 220 is coaxial with the shaft 202 and extends for about half of the length of the shaft. A transverse hole 222 penetrates through a diameter of the knob shaft 202 in the portion of the shaft already penetrated by the threaded hole 220.

Figure 7:
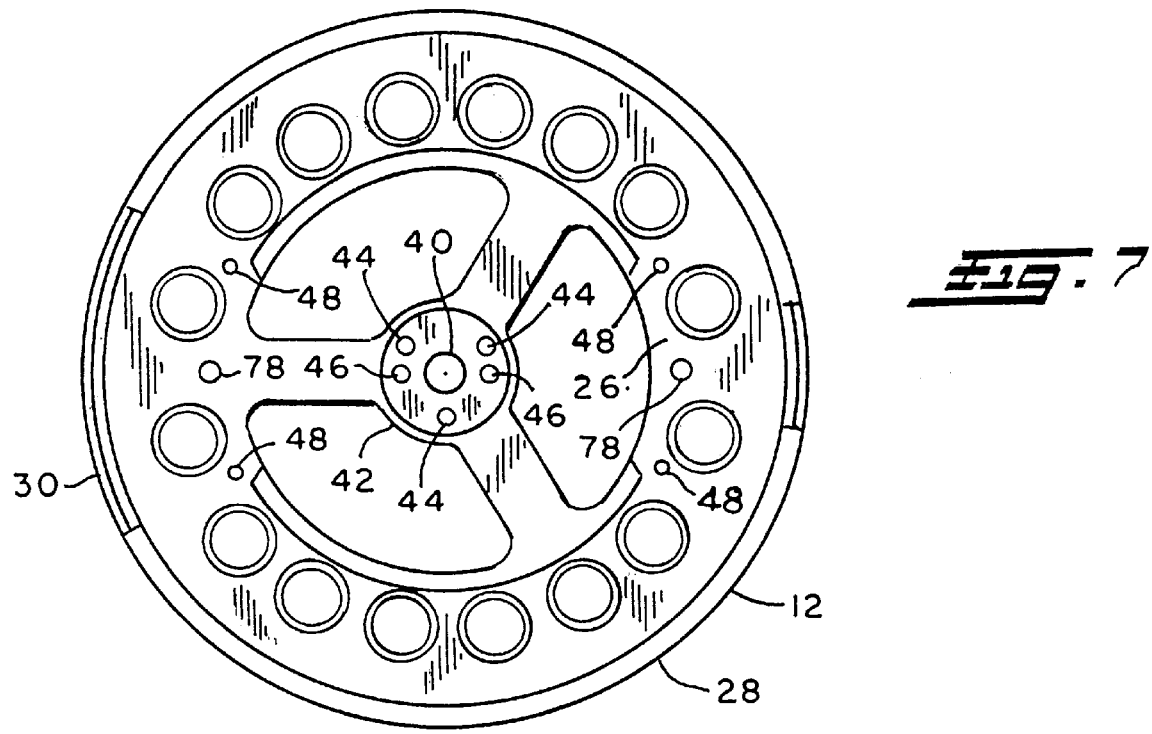
FIG. 7 is a plan view of the frame of the preferred embodiment disassembled from remaining elements.

As can be seen in FIG. 2, the knob shaft 202 is threaded into the knob 200 and the knob shaft 202 passes through an aperture at the center of the frame side wall 26 and into an outer shaft 224. The outer shaft 224 is permanently fixed to the inside of the frame side wall 26 by means of three machine screws (not shown) passing through the base of the shaft 224 and into screw holes 44 (FIG. 7). More or less screws may be used depending on the size of the reel. The outer shaft 224 is provided with three shoulders 226, 114 and 228. The ball bearing 98, upon which the friction plate 82 rides, rests against the first shoulder 226. This fixes the axial position of the friction plate 82. The ball bearing 112 upon which the end of the spool base 16 toward the frame side wall 26 rides rests against the second shoulder 114. There is some axial movement of the spool base 16 allowed with respect to the shaft 224. The third shoulder 228 is at an axial distance from the frame side wall 26 approximately equal to the distance to the far side of the ball beating 110 supporting the remote end of the spool base 16. With no compressive forces exerted on the ball bearing 110, the ball bearing 110 will extend slightly beyond the shoulder 228. This feature becomes important for drag adjustment.

The outer shaft 224 is hollow with a central bore 230 having a diameter slightly greater than the outside diameter of the knob shaft 202. The outer shaft 224 is provided with two aligned slots 232 on opposite ends of the diameter of the shaft. In the assembled state, a pin 234 is retained tightly in the transverse hold 222 through the knob shaft 202 and loosely in the two slots 232. This prevents rotation of the knob shaft 204 with respect to the outer shaft 224 while allowing some axial movement. The shaft bore 230 has an enlarged portion 238 at the end of the shaft adjacent the frame side wall 26. This accommodates knob shaft threads 206 which may penetrate into this area.

A pair of detente springs (only one shown) 242 are retained in apertures 244 in the base of the shaft 224. The detente springs 244 bear against round ended detente posts 246 which protrude from the detente holes 46 in the frame side wall 26.

A knob shaft screw 250 has a smooth shank 252 and an oversized head 254. The head 254 is provided with a slot 256. The shank 252 has a diameter equal to the diameter of the knob shaft 202. When the reel is assembled, the screw head 254 bears against a drag adjusting spring 260. The other end of the drag adjusting spring 260 bears against a cup-like spring holder 262 which surrounds the spring and the screw head 254. The bottom of the spring holder 262 bears against the ball bearing 110 which in turn bears against a shoulder 264 in the spool base 16. In the assembled state, the knob shaft screw 250 is threaded all the way into the threaded hole 220 in the knob shaft 202. A smooth shaft is thereby created. The distance between the head of the screw 254 and the knob shaft head 204 is fixed. Moreover, the knob shaft 202 and screw cannot rotate with the respect to the outer shaft 224 because of the pin 234 passing through both the outer shaft 224 and the knob shaft 202. Rotation of the knob 200 therefore causes the threads on the knob to rotate with respect to the threads 206 on the knob shaft. This rotation in one direction will pull the screw head 254 toward the frame side wall 26 which compresses the spring 260 applying an increased controlled force to the bearing 110 and thence the spool base 16. As previously described, the spool base 16 carries the plane bearing 120 which bears against the cork 94 forming the drag. Increased spring pressure is thereby applied to the drag increasing the drag force. The increased pressure is applied through the spring resulting in a constant force at a given setting. While drag adjustment in infinite as the knob can be rotated at any increment desired, it is also provided with detente every twelfth of a complete rotation of the knob. The detente positions are provided by the dimples 216 and detente posts 246.

A superior drag is provided. The force applied to the drag surfaces is not applied directly by means of direct compression. Rather, it is applied by pulling the screw head 254 against the spring 260. A constant spring pressure is applied rather than a mechanical direct compression of of one drag surface against the other. A more uniform spring pressure driven drag force is created.

The knob 200 bears against the frame side wall 26 through the plastic washer 214. Smooth rotation is thereby provided.

As described above, the reel 10 is initially set up by the fly fisher with the appropriate line and set up for the appropriate hand to retrieve. Thereafter, the adjusting screw 254 need never be removed. The spool 18 can be removed and a different spool substituted by action of the locks 160 only. No additional parts need to be removed from the reel to replace the spool. Periodically, at home or at a dealer shop, the adjusting screw 254 can be removed in a controlled inside environment and the reel cleaned and lubricated. This activity need not be performed in the field.

The above-described reel is robust, provides a large arbor for quick retrieve of line, is highly resistant to salt water, and it has a very smooth drag mechanism. These advantages and others are provided by the structures described above. While the invention has been described with reference to a preferred embodiment, obviously, modifications and alterations to this structure will occur to others upon the reading and understanding of this specification. It is intended to include all such modifications and alterations insofar as they come within the scope of the appended claims or the equivalents thereof.

Having thus described the invention, it is claimed:
1. A fly fishing reel having an axis comprising:
   a foot adapted to mount said reel on a fishing rod;
   a frame attached to said foot;
   a substantially hollow cylindrical spool base rotatably mounted on said frame, said spool base having a generally cylindrical outer surface;

a spool removably carried on said spool base; and, at least two spool retainers movably mounted on said spool base, said spool retainers comprising a movable lock member having an axial leg and a radial leg, and a spring biasing said lock member such that said radial leg extends beyond said spool base outer surface retaining said spool on said spool base.

2. The fly fishing reel of claim 1, wherein said lock member radial leg has a substantially flat radially extending inner surface and an outer surface having a portion extending radially outwardly and axially inwardly whereby a spool being placed upon said spool base will push said lock members toward said axis until said spool is fully seated.

3. The fly fishing reel of claim 2, wherein said lock members are fixed to said spool base by spring mounting means.

4. The fly fishing reel of claim 3, wherein said spring mounting means comprises screws passing through said lock members into said spool base and springs acting against said screws and said lock members.

5. A fly fishing reel having an axis comprising:

a frame having a side wall and a foot;

a shaft assembly comprising an outer shaft attached to said frame side wall, an inner shaft passing through said outer shaft and said frame side wall, said inner shaft being non-rotatable with respect to said outer shaft and having a threaded proximal end adjacent said frame side wall and a distal end, a drag spring bearing against said inner shaft distal end and a knob having threads engaging said inner shaft proximal end whereby said distal end may be drawn toward said frame side wall;

a friction plate bearing a first drag surface rotatably mounted on said shaft assembly;

a ratchet selectively allowing said friction plate to rotate in one direction only with respect to said frame;

a spool base having an annular portion bearing a second drag surface adapted to engage said friction plate drag surface, said spool base being rotatably mounted on said shaft assembly, said drag spring bearing against said spool base; and, a spool having a generally cylindrical barrel portion, a generally annular inner side wall and a generally annular outer side wall, said spool adapted to be releasably and non-rotatably mounted on said spool base.

6. The fly fishing reel of claim 5, wherein said spool base further comprises an outer cylindrical portion supporting said spool and an inner cylindrical portion rotatable on said shaft assembly.

7. The fly fishing reel of claim 6, wherein said spool base inner cylindrical portion is supported on a proximal bearing rotatable on said shaft assembly near said frame side wall and a distal bearing rotatable on said shaft assembly spaced from said frame side wall.

8. The fly fishing reel of claim 7, wherein said drag spring is retained in a spring holder which bears against said distal bearing whereby said drag spring applies axial spring force against said spool base and said drag surfaces.

9. The fly fishing reel of claim 8, wherein said inner shaft is comprised of a knob shaft adjacent said frame side wall forming the proximal end of said inner shaft and a knob shaft screw threadably engaging said knob shaft and forming the distal end of said inner shaft.

10. The fly fishing reel of claim 9, further comprising locking means releasably retaining said spool upon said spool base.

11. A fly fishing reel having an axis comprising:

a frame adapted to fix said reel to a rod;

a friction plate bearing a first drag surface rotatably mounted on said frame;

a ratchet selectively allowing said friction plate to rotate in one direction only with respect to said frame;

a spool base having a first generally cylindrical portion and an annular portion bearing a second drag surface adapted to engage said friction plate drag surface, said spool base being rotatably mounted on said frame;

a spool having a generally cylindrical barrel portion, a generally annular inner side wall and a generally annular outer side wall, said spool adapted to be releasably and non-rotatably mounted on said spool base; and, at least one lock on said spool base movable between an engaged position wherein said lock engages said spool outer side wall and a disengaged position wherein said lock does not engage said spool outer side wall and said spool may be removed from or mounted on said said spool base.

12. The fly fishing reel of claim 11, wherein said lock has an inboard end closest to said frame and an outboard end distant from said frame, said inboard end having a pin portion loosely engaging an opening in said spool base cylindrical portion and said outboard end being fixed to said spool base cylindrical portion, a spring means biasing said lock outboard end radially outwardly into said engaged position and allowing displacement of said outboard end radially inwardly into said disengaged position.

13. The fly fishing reel of claim 12, wherein said spring means comprises:

a screw having a head;

said screw passing through an aperture in said lock and engaging said spool base cylindrical portion;

said aperture having a spring bearing surface; and, a spring in said aperture engaging said screw head and said lock spring bearing surface.

14. The fly fishing reel of claim 13, wherein said lock includes an engagement flange extending radially outwardly having a generally flat, inner surface and an outer surface having a radially outwardly and inwardly sloping portion.

15. The fly fishing reel of claim 11, having at least two locks spaced from one another on said spool base.

16. The fly fishing reel of claim 11, wherein said friction plate is disk shaped having an outer periphery and said drag surface is a disk proximate said outer periphery.

17. The fly fishing reel of claim 11, wherein said frame comprises a foot, a side wall and a shaft assembly, said shaft assembly being coaxial with said reel axis, said shaft assembly bearing against said spool base and urging said spool base inwardly toward said frame side wall.

18. The fly fishing reel of claim 17, wherein said spool base additionally comprises a second generally cylindrical portion spaced inwardly from and coaxial with said first generally cylindrical portion; and, said shaft assembly comprises a shaft element having a proximal end adjacent said frame side wall, a distal end away from said side wall, a proximal spool base bearing rotatably and slidably supporting said spool base second cylindrical portion on said shaft assembly, a distal spool base bearing rotatably and slidably supporting said spool base second cylindrical portion on said shaft assembly, said distal spool base bearing being received in a recess in said spool base second cylindrical portion having an axially outwardly facing side wall whereby axial compressive force exerted on said distal spool base bearing is transmittal to said spool base, a spring compressed between said shaft element distal end and said distal spool base bearing, and a knob bearing against the outside of said frame side wall and threadably engaging said shaft element whereby said spring can be compressed altering the force applied to said drag surfaces.

19. A fly fishing reel having an axis comprising:

a foot adapted to mount said reel on a fishing rod;

a frame attached to said foot;

a drag disk selectively rotatable with respect to said frame having a first drag surface;

a spool assembly having a second drag surface frictionally engaging said first drag surface;

a ratchet preventing rotation of said drag disk with respect to said frame in one direction only, said ratchet comprising a toothed circular surface on said drag disk and a rotatable pawl on said frame, said pawl bearing against a single spring, said spring biasing said pawl into engagement with said toothed circular surface, said pawl having a first stable position preventing clockwise rotation and a second stable position preventing counterclockwise rotation.

20. The reel of claim 19, wherein said spring is a leaf spring.

21. The reel of claim 19, wherein said first drag surface and said second drag surface are flat disks.

22. The reel of claim 21, wherein said spool assembly has an outer edge, said first and second drag surfaces are concentric with said reel axis and have outer edges close to said spool assembly outer edge.

23. The reel of claim 19, wherein said pawl is rotatable about a pin engaging said frame.

\* \* \* \* \*